No. 656,494. Patented Aug. 21, 1900.
J. WHEELER.
WAGON BRAKE.
(Application filed Nov. 15, 1899.)
(No Model.)
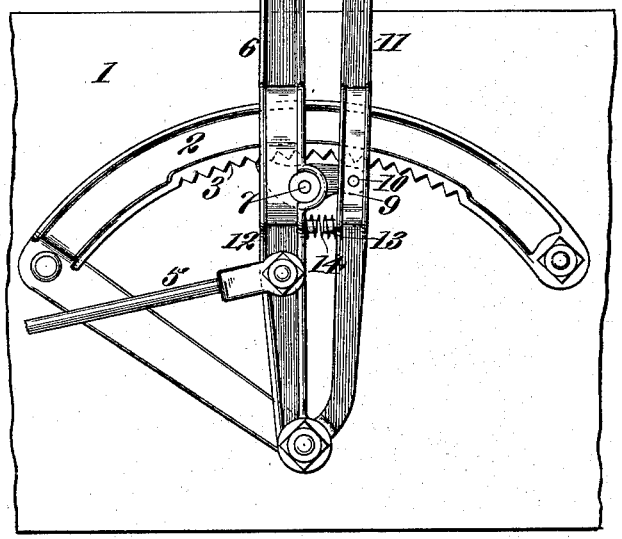
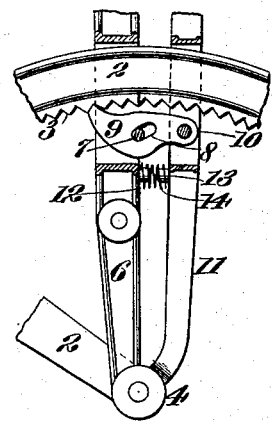
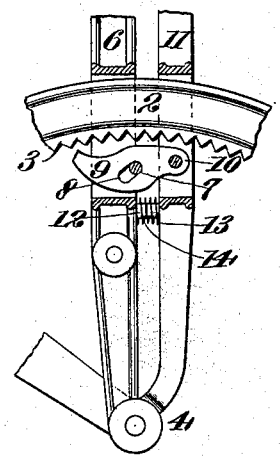
Attest,
Charles Pickles
R. C. Hann
Inventor,
Jesse Wheeler,
By Stanley Stoner
Atty

UNITED STATES PATENT OFFICE.

JESSE WHEELER, OF ST. LOUIS, MISSOURI, ASSIGNOR OF ONE-HALF TO LUCIUS M. CONKLING, THOMAS H. CONKLING, AND EMMA CONKLING SMITH, OF SAME PLACE.

WAGON-BRAKE.

SPECIFICATION forming part of Letters Patent No. 656,494, dated August 21, 1900.

Application filed November 15, 1899. Serial No. 737,042. (No model.)

*To all whom it may concern:*

Be it known that I, JESSE WHEELER, a citizen of the United States, residing at the city of St. Louis, State of Missouri, have invented certain new and useful Improvements in Wagon-Brakes, of which the following is a specification.

My invention relates to certain features of construction wherein a new and improved form of dog operated by the usual levers engages an ordinary rack. The novel features are herein specifically pointed out and claimed.

Referring to the drawings which illustrate my invention, Figure I shows a side elevation of the brake-levers in a locked position. Fig. II shows a detail of same with the straps over the quadrant in section. Fig. III is similar to Fig. II, except that the dog is released from the rack.

1 is the wagon-body.

2 is a quadrant secured to the body 1 in the usual manner. 3 is a rack on said quadrant placed on the lower side.

4 is the pivot.

5 is the operating-rod, pivoted at its forward end to the main lever and at the rear end to the brake mechanism. (Not shown.)

6 is the main lever, pivoted at 4 and to which the forward end of the operating-rod 5 is attached.

7 is a slot-pin secured to the front side of the lever 6, which rides in an inclined slot 8 of the dog 9. This dog 9 is secured by the pivot-pin 10 to the auxiliary lever 11, which is likewise pivoted at 4.

12 and 13 are bosses placed on adjacent sides of the levers 6 and 11, and 14 is a coil-spring placed on said bosses for the purpose of keeping the levers apart.

The device is operated as follows: When in the position shown in Figs. I and II, the tooth of the dog 9 is engaged in the rack 3, with the pin 7 (secured to the lever 6) at the bottom of slot 8. To disengage the same, the auxiliary lever 11, operated by the hand, is drawn toward the main lever 6 to resist the action of the coil-spring 14 or to the position shown in Fig. III. The dog 9, pivoted at 10 to the auxiliary lever, rides downward, being forced into that position by reason of the inclined slot 8. This action draws the tooth of the dog 9 from the rack 3 and allows the lever 6 to be swung about the common pivot 4, to tighten or slack the operating-rod 5, as desired. When the required position is reached, the operator allows the auxiliary lever 11 to become free, and the spring 14 forces the levers apart. The dog 9 is carried by the lever 11, and the motion draws the tooth of said dog up into engagement with the rack 3. This locks the same, so as to hold it as required.

While I have described this device as applying to wagon-brakes, I do not limit myself to this use, as it may be applied to any mechanism requiring a similar lock.

What I claim as new, and desire to secure by Letters Patent of the United States, is—

In a wagon-brake, the combination of a quadrant having a rack, a main lever, a pin secured to said main lever, an auxiliary lever, said two levers having a common pivot, a dog pivoted to said auxiliary lever and provided with a slot oblique to the radius extending from said common pivot, and in which said pin is adapted to ride and operate said dog, and a spring adapted to keep said levers separated, substantially as described.

JESSE WHEELER.

In presence of—
R. C. KANN,
THOS. RIELLEY.